(12) United States Patent
Myl

(10) Patent No.: US 12,269,766 B2
(45) Date of Patent: Apr. 8, 2025

(54) GLASS SHAPING APPARATUS

(71) Applicant: PILKINGTON AUTOMOTIVE POLAND Sp. z o.o., Sandomierz (PL)

(72) Inventor: Lukasz Myl, Sandomierz (PL)

(73) Assignee: PILKINGTON AUTOMOTIVE POLAND Sp. z o.o., Sandomierz (PL)

( * ) Notice: Subject to any disclaimer, the term of this patent is extended or adjusted under 35 U.S.C. 154(b) by 899 days.

(21) Appl. No.: 17/266,330

(22) PCT Filed: Aug. 8, 2019

(86) PCT No.: PCT/PL2019/000064
§ 371 (c)(1),
(2) Date: Feb. 5, 2021

(87) PCT Pub. No.: WO2020/032812
PCT Pub. Date: Feb. 13, 2020

(65) Prior Publication Data
US 2021/0317029 A1 Oct. 14, 2021

(30) Foreign Application Priority Data
Aug. 8, 2018 (PL) .......................... 426609

(51) Int. Cl.
*C03B 23/03* (2006.01)
*C03B 29/00* (2006.01)
(52) U.S. Cl.
CPC .......... *C03B 23/0307* (2013.01); *C03B 23/03* (2013.01); *C03B 29/00* (2013.01); *C03B 2225/02* (2013.01)
(58) Field of Classification Search
CPC .............................. C03B 23/03; C03B 2225/02
See application file for complete search history.

(56) References Cited

U.S. PATENT DOCUMENTS

| 4,104,047 A | 8/1978 | Seymour |
| 4,204,853 A | 5/1980 | Seymour |
| (Continued) | | |

FOREIGN PATENT DOCUMENTS

| EP | 2142483 A1 | 1/2010 |
| JP | S59102828 A | 6/1984 |
| (Continued) | | |

OTHER PUBLICATIONS

International Search Report (PCT/ISA/210) and Written Opinion (PCT/ISA/237) mailed on Nov. 7, 2019, by the European Patent Office as the International Searching Authority for International Application No. PCT/PL2019/000064.

(Continued)

*Primary Examiner* — Erin Snelting
(74) *Attorney, Agent, or Firm* — BUCHANAN INGERSOLL & ROONEY PC

(57) ABSTRACT

The invention relates to a method for shaping a glass sheet having a reflective low emissivity coating thereon comprising the steps: (i) positioning the coated glass sheet at a furnace entrance; (ii) conveying the coated glass sheet through the furnace to heat the glass sheet to a temperature suitable for shaping; (iii) transferring the coated glass sheet on to a first bending tool for supporting the coated glass sheet, the first bending tool having a fixed wall and first, second and third movable walls; (iv) moving at least one of the first, second and third movable walls to adjust the position of the coated glass sheet on the first bending tool ring from a first position to a second position; and (v) shaping the coated glass sheet between the first bending tool and a die. Apparatus for carrying out the method is also disclosed.

6 Claims, 1 Drawing Sheet

(56) References Cited

U.S. PATENT DOCUMENTS

| | | | |
|---|---|---|---|
| 4,282,025 A | | 8/1981 | Roth et al. |
| 4,300,935 A | | 11/1981 | Seymour |
| 4,632,688 A | | 12/1986 | Rahrig |
| 4,666,493 A | | 5/1987 | Frank |
| 5,340,375 A | * | 8/1994 | Anttonen ............... C03B 35/145 65/273 |
| 2009/0084138 A1 | * | 4/2009 | Imaichi ............... C03B 23/0357 65/106 |
| 2010/0190001 A1 | * | 7/2010 | Barton ............... B32B 17/10174 65/60.2 |
| 2011/0247367 A1 | | 10/2011 | Nitschke et al. |
| 2013/0091896 A1 | | 4/2013 | Nitschke et al. |
| 2014/0131168 A1 | | 5/2014 | Guo |
| 2014/0271058 A1 | | 9/2014 | Nitschke |
| 2016/0257598 A1 | | 9/2016 | Vild |
| 2018/0186681 A1 | * | 7/2018 | Dechirot ................. C03B 23/03 |
| 2018/0362386 A1 | * | 12/2018 | Betschart ................ C03B 35/16 |

FOREIGN PATENT DOCUMENTS

| | | |
|---|---|---|
| JP | H06247728 A | 9/1994 |
| JP | 2014534154 A | 12/2014 |
| WO | 2013059000 A2 | 4/2013 |
| WO | 2017079201 A1 | 5/2017 |
| WO | 2017079251 A1 | 5/2017 |

OTHER PUBLICATIONS

Search Report issued by the Polish Patent Office in Polish Patent Application No. P.426609, dated Sep. 4, 2018, (2 pages).

\* cited by examiner

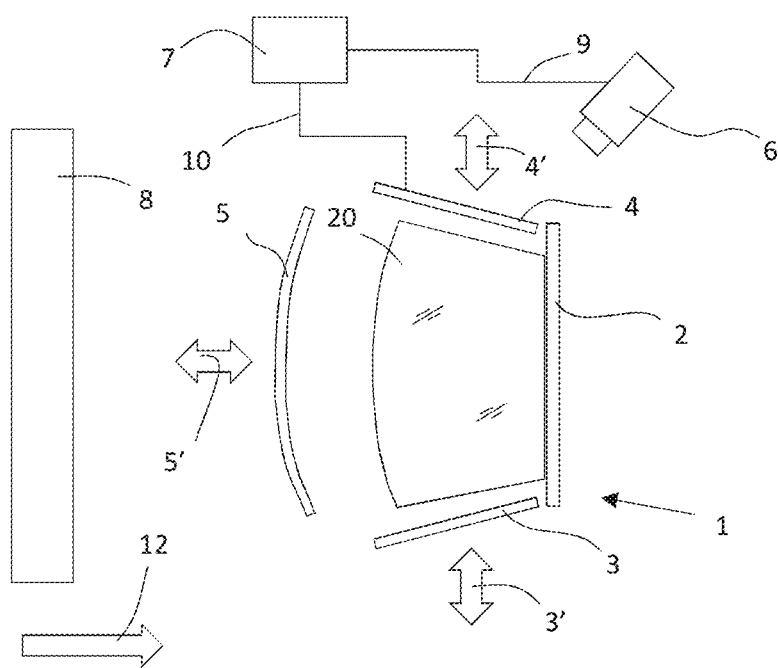

GLASS SHAPING APPARATUS

The present invention relates to an apparatus for shaping a glass sheet, in particular to a glass sheet coated with a reflective low emissivity coating, and to a method for shaping a coated glass sheet.

There are many known apparatus used in press bending a glass sheet for the automotive industry. U.S. Pat. No. 4,282,025 discloses a device for transporting a sheet of glass through sheet processing stations of a furnace. The device comprises a carriage having a carrying frame including a longitudinal horizontal member supporting a plurality of sheet hangers. The longitudinal horizontal member is rigidly connected at its center portion to the carriage and movably connected to the carriage at other portions.

U.S. Pat. No. 4,104,047 discloses a system for supporting self-closing tongs specially adapted for gripping thin glass sheets (4.5 millimeters and less) during thermal processing, such as that involved during press bending wherein the glass sheets are brought to a sudden start and a sudden stop that promotes swinging of the tongs and its supported glass. The present invention limits the tong swinging so that the glass sheets can be aligned with small tong receiving notches in press bending molds, thereby improving the conformity of press bent glass sheets to their desired shapes.

US20110247367 discloses a press bending station for heated glass sheets includes a conveyor having a lower support structure and central conveyor assemblies with horizontal rollers as well as having lateral outward wheel conveyor assemblies with wheels 44 and/or laterally outward inclined roller conveyor assemblies with inclined rollers for supporting and conveying upwardly formed portions of a preformed heated glass sheet with an upwardly concave shape. Each conveyor assembly has a detachable connection to a drive mechanism of the lower support to provide rotational driving of a roller or wheel of each conveyor assembly. An actuator provides relative vertical movement that lifts the heated preformed glass sheet received by the conveyor to provide press bending thereof between a lower press ring and an upper press mold JP2014534154 discloses a method and apparatus for positioning glass sheets for forming includes positioners that are moved slower than the speed of glass sheet conveyance to provide rotational adjustment of a glass sheet into alignment above a forming mold. The forming mold is moved upwardly for the forming in a pressing manner against a downwardly facing upper mold. Both preformed and flat glass sheets can be positioned by different embodiments of the apparatus.

A common way to improve window insulation includes coating a glass sheet with a coating to reflect a significant part of the radiant heat, while maintaining the transparency of glass sheet. Such coatings are well known and applied to flat glass for architectural applications. For automotive glazings it is known to laminate a sheet carrying an infrared reflective film between two glass sheets.

Automotive glass bending processes (e.g. gravity or assisted such as press bending) are widely known and applied. A functional coating on the glass (including coatings that limit the heat transfer coefficient such as low emissivity coatings) are also widely known and applied.

Functional coatings for example low emissivity coatings are difficult to heat causing difficulties in achieving the desired shape. The main advantage of glass with a low emissivity coating is an obstacle in the process of glass shaping. As is known in the art, glass to be shaped is carried out using heated transferred to the glass by radiation and/or convection and/or conduction.

It is known to shape a glass sheet by heating the glass sheet in a furnace to a temperature suitable for shaping and to shape the heated glass sheet between a shaping ring and a die to obtain the desired shape.

A glass sheet with low emissivity coating thereon undergoes uneven heating in the furnace due to the difficulty of getting heat into the coated surface.

Such a coated glass positioned at the same place on the conveyor before entering the heating furnace may exit the furnace differently. When the coated glass sheet is heated up unevenly the coated glass sheet may "break away" from the conveyor rollers locally as the coated glass sheets becomes curved due to the uneven temperature gradient therein (as illustrated in FIGS. 1a and 1b), resulting in rotation of the coated glass sheet on the conveyor. Possible offset of the glass before a press bending operation results in an incorrect geometry of the bent product. It is difficult to position the heated coated glass sheet before shaping due to the high temperature reached for shaping.

The present invention provides a solution to this problem.

Accordingly, from a first aspect the present invention provides apparatus for shaping a coated glass sheet comprising a roller conveyor for conveying a coated glass sheet, a die and frame having a rim for supporting the coated glass sheet thereon in the shape of a target product, the frame having a fixed wall and least one movable wall.

Preferably the movable wall is movable in a horizontal direction.

Preferably the movable wall is movable by an oscillating movement.

Preferably the frame has two movable walls.

Preferably the frame has three movable walls.

Preferably the frame has only three movable walls.

Preferably the apparatus comprises a camera for monitoring the shaping operation, the camera being combined with a control system for controlling the movement of the movable walls.

From another aspect the present invention provides a method for shaping a glass sheet having a reflective low emissivity coating thereon comprising the steps: (i) positioning the coated glass sheet at a furnace entrance; (ii) conveying the coated glass sheet through the furnace to heat the glass sheet to a temperature suitable for shaping; (iii) transferring the coated glass sheet on to a first bending tool for supporting the glass sheet, the first bending tool having a fixed wall and first, second and third movable walls; (iv) moving at least one of the first, second and third movable walls to adjust the position of the coated glass sheet on the shaping ring; and (v) shaping the coated glass sheet between the first bending tool and a die.

Preferably during step (iv) the first, second and third movable walls are moved to adjust the position of the coated glass sheet on the first bending tool.

Preferably the first bending tool is a shaping ring.

Preferably the method includes including a monitoring step for monitoring the position of the coated glass sheet on the first bending tool to provide an output, wherein the output is used to provide an input for moving the or a subsequent coated glass sheet from a first position to a second position.

The present invention will now be described with reference to the following FIGURE (not to scale) in which:

FIG. 1 is a plan view of a portion of a coated glass shaping line.

A press bending station for bending a coated glass sheet according to the invention has a roller conveyor for the coated glass sheet, a die and frame with a rim characterized in that the frame is in the shape of the target product and consists of a fixed wall/support and three movable walls that may move horizontally in an oscillating movement. Preferably the press bending station includes a camera for observing the pressing action, combined with a control system for moving the movable walls of the frame.

In a preferred embodiment the method is based on the use of a frame consisting of four separable walls including three movable walls that allows an adjustment of the position of the coated glass sheet before bending by moving the sides of the frame. When the coated glass sheet rotates or moves in a heating oven, the frame is able to correct the position coated glass sheet. The frame then is used as the lower support for the coated glass sheet which is pressed between a die and the frame to provide the desired shape.

FIG. 1 shows a schematic plan view of a press bending station of the type just described. The press for bending glass comprises a frame 1 for supporting the coated glass sheet 20 thereon, and a die (not shown) to press the coated glass sheet supported on the frame 1. A roller conveyor having rollers (one of which is shown and labelled 8) transports the coated glass sheet 20 in a direction of glass travel shown by arrow 12.

The frame 1 is in the shape of the target product and has a fixed retaining wall 2, and three movable walls 3, 4 and 5 that are movable horizontally in the direction of respective arrows 3', 4' and 5'. The movable walls 3, 4 and 5 provide the frame 1 with a movable surface or rim. A camera 6 is used to monitor the pressing operation and is in communication with control system 7 via suitable cabling 9. The control system 7 is in communication (via suitable cabling 10) with the movable walls 3, 4 and 5 of the frame 1 to allow control of the movement thereof.

The coated glass sheet 20 has a reflective low emissivity coating on a major surface thereof facing away from the conveyor rollers. The coated glass sheet 20 is accurately positioned before entering a heating furnace. After heating the coated glass sheet can rotate on the conveyor rollers 8. The rotated coated glass sheet is deposited on the frame 1 and is prevented from moving in the direction of glass travel 12 by the fixed retaining wall 2. The movable walls 3, 4 and 5 are sufficiently opened to allow the coated glass sheet to be supported thereon. The movable walls are then moved to the correct position using a predetermined algorithm by moving the movable walls with respect to the fixed wall 2 to correct the position of the coated glass sheet 20. With the coated glass sheet in the corrected position for bending, the coated glass sheet is shaped using an upper die (not shown). The corrected position of the coated glass sheet on the frame 1 avoids abnormal/incorrect shaping of the coated glass sheet.

In addition, the camera 6 is oriented to monitor the pressing operation and can verify the accuracy of the positioning of the coated glass sheet by the frame 1. An operator is able observe images from the camera to make on-the-fly adjustments to the positioning of the coated glass sheet by the movable wall of the frame.

The present invention provides an apparatus and method for shaping coated glass sheets that allows movement of a coated glass sheet during a heating step in a heating furnace to be corrected such that after the coated glass sheet has been heated, the coated glass sheet can be moved into a desired position for bending.

The invention claimed is:

1. A method for shaping a glass sheet having thereon a reflective coating configured to reduce heat emitted from the glass sheet comprising:
   (i) positioning the coated glass sheet at a furnace entrance;
   (ii) after step (i), conveying the coated glass sheet through the furnace to heat the coated glass sheet to a temperature suitable for shaping;
   (iii) after step (ii), transferring the coated glass sheet on to a frame, the frame having a fixed wall and first, second and third movable walls, the coated glass sheet being supported by the first, second and third movable walls;
   (iv) after step (iii), moving at least one of the first, second and third movable walls to adjust the horizontal position of the coated glass sheet on the frame from a first position to a second position; and
   (v) after step (iv), shaping the coated glass sheet between the frame and a die.

2. A method according to claim 1, wherein during step (iv) the first, second and third movable walls are moved to adjust the horizontal position of the coated glass sheet on the first bending tool.

3. A method according to claim 1, wherein the first bending tool is a shaping ring.

4. A method according to claim 1, including monitoring a position of the coated glass sheet on the first bending tool to provide an output, wherein the output is used to provide an input for moving the coated glass sheet, or a subsequent coated glass sheet, from the first position to the second position.

5. A method for shaping a glass sheet having thereon a reflective coating configured to reduce heat emitted from the glass sheet comprising:
   (i) positioning the coated glass sheet at a furnace entrance;
   (ii) after step (i), conveying the coated glass sheet through the furnace to heat the coated glass sheet to a temperature suitable for shaping;
   (iii) after step (ii), transferring the coated glass sheet on to a frame, the frame having a fixed wall and first, second and third movable walls, the first, second and third movable walls being in a first configuration thereby supporting the coated glass sheet thereon;
   (iv) after step (iii), moving at least one of the first, second and third movable walls such that the frame is moved to a second configuration to adjust the horizontal position of the coated glass sheet on the frame from a first position to a second position; and
   (v) after step (iv), shaping the coated glass sheet between the frame and a die.

6. A method for shaping a glass sheet having thereon a reflective coating configured to reduce heat emitted from the glass sheet comprising:
   (i) positioning the coated glass sheet at a furnace entrance;
   (ii) after step (i), conveying the coated glass sheet through the furnace to heat the coated glass sheet to a temperature suitable for shaping;
   (iii) after step (ii), transferring the coated glass sheet on to a frame, the frame comprising a fixed wall and a rim for supporting the coated glass sheet thereon, the rim comprising a surface of a first movable wall, a surface of a second movable wall and a surface of a third movable wall; and wherein after the coated glass sheet has been transferred onto the frame, the coated glass sheet is supported by the rim;
   (iv) after step (iii), moving at least one of the first, second and third movable walls to adjust the horizontal position of the coated glass sheet on the frame from a first position to a second position; and (v) after step (iv), shaping the coated glass sheet between the frame and a die.

\* \* \* \* \*